March 1, 1960 H. R. VAN GOEY ET AL 2,926,609
GAS OPERATED SAFETY AND ARMING MECHANISM
Filed May 28, 1958 2 Sheets-Sheet 1

INVENTORS
HENRY R. VAN GOEY
THOMAS C. CAMPBELL
BY
ATTORNEYS

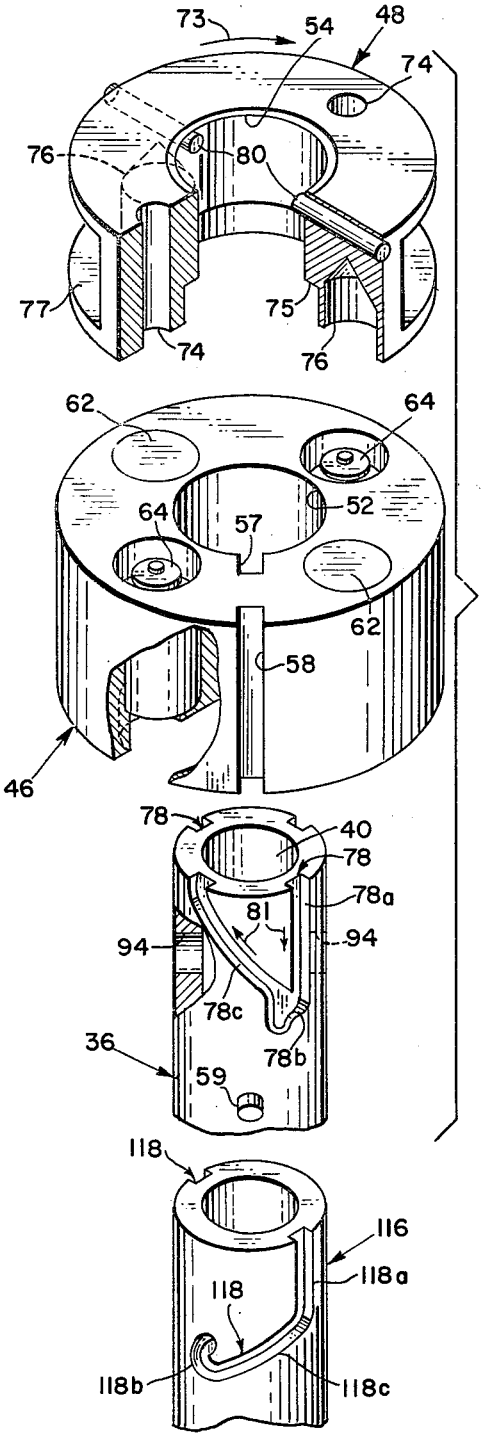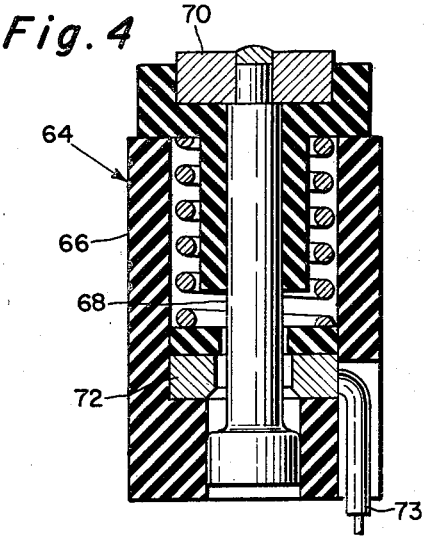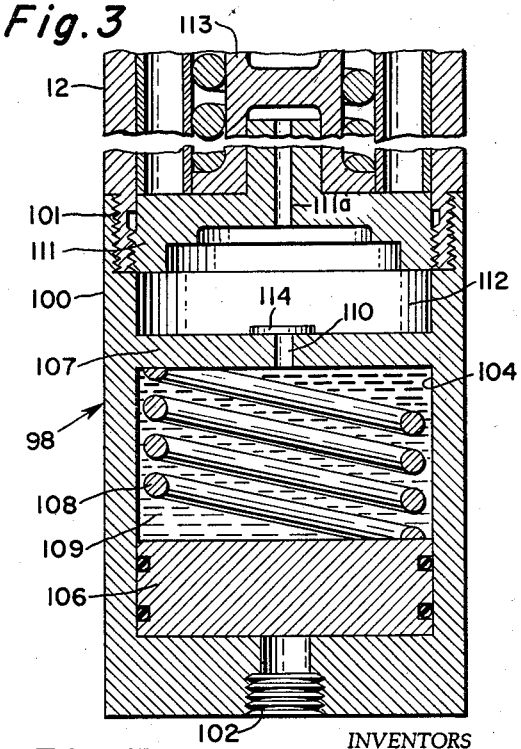

United States Patent Office 2,926,609
Patented Mar. 1, 1960

2,926,609

GAS OPERATED SAFETY AND ARMING MECHANISM

Henry R. Van Goey, Camarillo, and Thomas C. Campbell, Ventura, Calif., assignors to the United States of America as represented by the Secretary of the Navy Application May 28, 1958, Serial No. 738,579

9 Claims. (Cl. 102—70)

(Granted under Title 35, U.S. Code (1952), sec. 266)

The invention described herein may be manufactured and used by or for the Government of the United States of America for governmental purposes without the payment of any royalties thereon or therefor.

This invention relates to a safety and arming mechanism for a rocket-powered missile, and more specifically to such a mechanism capable of being operable by a sustained gas pressure generated by the missile propulsion motor after a predetermined time interval.

A design criteria of fuses for all types of missiles, i.e., guided and unguided projectiles, requires the provision of a safety mechanism capable of preventing premature ignition of the explosive mechanism. This requirement is more complicated in air-borne missiles launched from supersonic aircraft, because the aircraft is traveling at high speeds in the same direction as the launched missile. One of the prior art expedients is to use an inertia means responsive to missile acceleration, frequently referred to as "setback" to ensure that the fuse will not be armed until the projectile reaches a predetermined acceleration. Another expedient in rocket powered projectiles is to utilize gas pressure generated by the rocket motor to arm the fuse, as may be illustrated by U.S. Patent No. 2,704,033. In this patent gas pressure flexes a diaphragm which instantaneously releases the firing pin.

These safety expedients have been found to be satisfactory for conventional type projectiles, however, they are not suitable for air-launched missiles from supersonic speed aircraft because of the inherent danger to the launching aircraft. Therefore, another design criteria is to prevent arming of the fuse until the missile has advanced sufficiently ahead of the launching aircraft to avoid damage to the aircraft by fuse and warhead ignition.

According to the present invention all of these requirements are met by preventing missile fuse arming until the rocket motor has burned out or has burned for a predetermined time. The safety and arming mechanism is committed when the launched missile reaches a predetermined acceleration, the rocket motor having been ignited and generating a predetermined pressure. However, the missile fuse is not armed until the gas pressure has reached a sustained pressure to ensure that the missile has traveled a sufficiently safe distance ahead of the launching aircraft. In the preferred embodiment, arming occurs upon motor burnout. The pressure developed by the rocket motor acts on a piston-like member to advance a shutter member to commit the mechanism. Upon motor burnout, the absence of pressure on the piston causes it to be spring returned to the original position which movement further advances the shutter to arm the mechanism. In another modification suitable for long range missiles, complete motor burnout is not necessary, and arming of the mechanism occurring after a predetermined timed interval of rocket motor burning.

A principal object of this invention is to provide a safety and arming mechanism for rocket fuses on air launched missiles that is operable by rocket motor gas pressure, and which will not become armed until the gas pressure has attained a predetermined sustained force.

A further object is to provide such a mechanism wherein means are provided for limiting the application of a working fluid to arm the mechanism, and a corollary object is to provide such a means which is adjustable.

Another object is to provide such a mechanism in which the fuse is not committed until the rocket motor ignites and increases to a predetermined pressure; and the fuse is not armed until after this pressure decreases by motor burnout.

A still further object is to provide a safety and arming mechanism that is simple and light weight in construction, which has a positive action, and which does not depend on stored energy for arming.

Other objects and many of the attendant advantages of this invention will be readily appreciated as the same becomes understood by reference to the following detailed description when considered in connection with the accompanying drawings wherein:

Fig. 3 is an enlarged exploded top perspective view of the shutter, manifold, and piston, partly in section, the parts being in pre-launch position;

Fig. 4 is a longitudinal section of the squib switch;

Fig. 7 is a modified safety and arming mechanism utilizing a hydraulic means for delaying application of the energy obtained from the rocket gas pressure to the mechanism; and Fig. 8 is a partial top perspective view of a modified piston for use on long range missiles where arming of the mechanism occurs prior to motor burnout.

Figure 1:
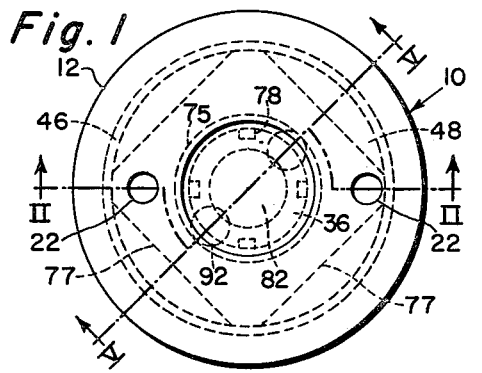
Fig. 1 is a top view of the invention safety and arming mechanism.
Figure 2:
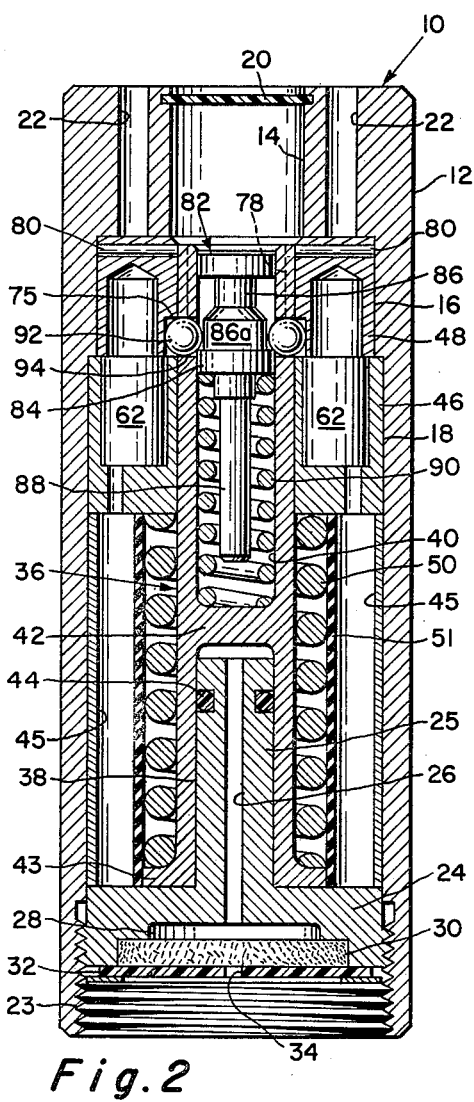
Fig. 2 is a longitudinal section taken along line II—II of Fig. 1 showing the parts in pre-launch position.

Referring to the drawings wherein similar parts are designated by the same reference numerals there is shown in Figs. 1 and 2, a missile safety and arming mechanism 10 which comprises a cylindrical hollow case 12 having a central bore portion 14 and two enlarged adjacent concentric bore portions 16 and 18, respectively. Bore 14 is closed at one end by a dust cap 20, made of Plexiglas, adapted to be snap-fitted into an annular recess in the bore portion. Adjacent bore 14, the case is provided with a pair of longitudinal drilled openings 22 disposed 180 degrees apart, each opening leading from bore 16 to a booster motor, not shown, adapted to be mounted on the upper and forward end of the case. Openings 22 comprise one section of an interruptable passageway that forms a powder train from a squib charge to a booster charge in a manner to be described.

Bore 18 consists of a major portion of the case and is internally threaded at the aft end 23 for attachment to the rocket motor, not shown. Bore 18 threadably receives a guide member comprising a plug 24 having an integral rod portion 25 projecting into bore 18 from the inner face thereof. Rod 25 is provided with a longitudinal drilled passage 26 extending from the free end to a recessed chamber 28 on the outer face of plug 24 into which gas pressure is admitted during ignition of the rocket motor. A filter pad 30 and a teflon washer 32 having a central aperture 34 of a selected diameter are positioned adjacent chamber 28, the aperture functioning as a valve to meter the gas pressure to the device. Filter pad 30 serves to delay the admission of gas pressure into the mechanism so that the safety and arming mechanism is armed only by a sustained pressure as distinguished from an instantaneous pressure, the latter occuring at the initial rocket motor ignition. As will be described in Fig. 7 a hydraulic piston can be used instead of a pad to accomplish this result.

Reciprocably mounted in radially spaced relation within the case is a hollow piston-like member 36 being divided into two end chambers 38, 40 by an intermediate transverse wall 42. The lower end of the piston is provided with a flange 43 which normally abuts plug 24. Chamber 38 slidably receives guide rod 25 and is sealed thereto by an O-ring 44. In the at rest position (Fig. 2) the end of rod 25 preferably is spaced from wall 42 to provide adequate piston area to the gas pressure in passage 26 during rocket motor ignition. Axial movement of piston 36 by the presence (and absence) of gas pressure functions to arm the device in a manner hereinafter described.

Juxtaposed to the lower portion of bore 18 is a spacer tube 45 that supports a manifold 46 and a shutter 48 against annular shoulders in the case in the upper portion of bore 18 and bore 16, respectively. A compression coil spring 50 is positioned between manifold 46 and piston flange 43 for biasing the piston in the at rest or prelaunch position shown in Fig. 2. A tubular cover 51 encloses spring 50 and provides additional support for manifold 46, cover 51 being concentrically spaced from tube 45 to form an annular passage for electrical wires, not shown.

As best illustrated in Figs. 2 and 3, manifold 46 and shutter 48 are washer-shaped having central bore portions 52 and 54, respectively, through which freely slides piston 36. Manifold 46 has two longitudinally extending keyways 57 and 58 on the inner and outer peripheral surfaces respectively, the former adapted to receive an outwardly projecting pin 59 mounted on piston 36, and the latter receiving an inwardly projecting pin 60 on the case (see Figs. 5 and 6). The mating pins and slots prevent relative rotation between the respective parts while permitting reciprocal movement of the piston during arming of the fuse. Shutter 48 on the other hand is capable of limited rotation in bore 16 about the longitudinal axis of the device as will be explained. Manifold 46 is provided with four longitudinally drilled openings, two opposite openings housing a squib 62 for igniting the booster charge, and the remaining alternate recesses housing a switch assembly 64 for controlling squib ignition through a fuse, not shown. A suitable squib for this purpose is the MARK 124 primer, (U.S. Navy, Bureau of Ordnance).

As shown in Fig. 4, switch assembly 64 comprises a Micarta shell 66 through which extends a spring-loaded plunger 68 having on the upper end a pin contact 70 adapted to be restrained in one of two positions by shutter 48. In the open position illustrated, the base of plunger 68 is spaced from a ring contact 72 connected by wires 73 to a fuse, not shown. In the closed position, the plunger is released by the shutter and by spring action engages contact 72 to ground the circuit through the shutter, in a manner presently to be described, and rendering the squib ready for ignition.

Shutter 48, like manifold 46, also contains four longitudinally drilled openings, two opposite passageways 74 extend completely therethrough, while an alternate pair of openings 76 extend from the bottom of the shutter and terminate in a conical dead-end wall. The bottom of the shutter has an annular recess 75 extending around bore 54. Four chord-like slots 77 are milled in the periphery of the shutter for weight reduction. Shutter 48 is rotatable from a pre-launch position to an armed (motor burnout) position. In the prelaunch position illustrated in Figs. 1-3 squibs 62 are blocked from passages 22 in the case by dead end openings 76, and switches 64 are maintained in an open condition by engagement of contact 70 with the shutter at the smaller diameter passageways 74. In the armed position, shutter 48 is rotated by piston 36 90 degrees in a clockwise direction indicated by arrow 73, which movement longitudinally aligns each squib 62 with the respective passageways 74 and 22, completing the power train to the booster charge. Simultaneously each switch 64 becomes aligned with the larger dead end opening 76 enabling plunger 68 to be released and seating contact 70 on the self-centering conical wall and grounding the switch and fuse circuit.

Figure 5:
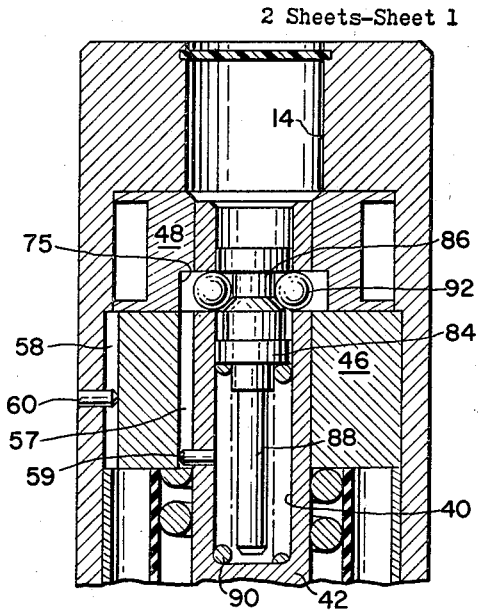
Fig. 5 is a partial longitudinal section taken along line V—V of Fig. 1 after setback has released the shutter.
Figure 6:
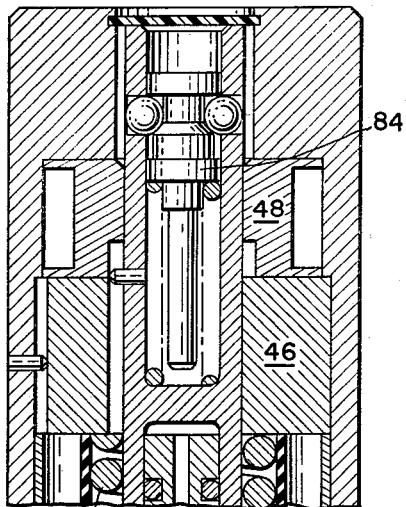
Fig. 6 is a similar view as Fig. 5 showing the piston advanced by motor burning.

Rotation of shutter 48 is effected by a pair of V-shaped grooves 78 formed on the periphery of piston 36 adjacent chamber 40, each groove accommodating a pin 80 radially mounted in shutter 48. The path traversed by pins 80 is indicated by arrows 81. The configuration of the groove will depend on the particular missile requirements. As shown in Fig. 3, in the preferred embodiment groove 78 comprises a longitudinal straight section 78a, a slanted curved section 78c joined by an offset section 78b located at the rearwardly directed apex, the offset section functioning to prevent the pin from retracing its path once it reaches the apex. At the start of missile launching, shutter 48 is locked in the pre-launching position (Fig. 1) by a setback device 82 until the missile attains a predetermined accleration. Setback device 82 is housed in piston chamber 40 and comprises an acceleration responsive weight 84 constructed as a plunger having oppositely extending stems 86 and 88. Stem 88 functions as a limit stop and as a guide for a compression coil spring 90 positioned between wall 42 and the plunger, the spring biasing weight 84 in the direction of missile flight. Spring 90 is retarded by a pair of ball detents 92 which project through two radially aligned openings 94 in the forward end of the piston, and into opposite sides of annular recess 75 in the shutter. Balls 92 are laterally restrained into engagement with the piston and the shutter, preventing longitudinal movement therebetween, by a plunger shoulder 86a until the missile attains a predetermined acceleration. As shown in Fig. 5, acceleration responsive weight 84 is moved aft to a position enabling balls 92 to be displaced laterally against stem 86 to unlock the piston and shutter.

In the prelaunch condition of the safety and arming device in Fig. 2, each powder train from squib 62 to passageway 22 is in a disarmed position being blocked by shutter 48 therebetween. Switch 64 is maintained in an open condition by engagement with the shutter. Piston 36 is restrained from a forward longitudinal movement by balls 92, and shutter 48 is restrained from rotation by engagement of pin 80 with groove 78.

In the embodiment of Figs. 1-6, three environmental conditions are required to arm the device and the fuse, the first two conditions, setback and sustained motor burning, committing the fuse; and the third condition, motor burnout, arming the fuse. Setback occurs when the missile reaches sufficient acceleration to force weight 84 aft against spring 90 to displace balls 92 and release piston 36. The second condition arises when the rocket motor develops sufficient sustained gas pressure, i.e., 600 p.s.i., behind piston wall 42 to compress spring 50. The upward movement of piston 36 causes a corresponding movement of each groove 78a with respect to its pin 80. When the motor pressure reaches a predetermined value (depending on the strength of compression spring 50) each pin 80 enters offset groove 78b, slightly rotating the shutter, which commits the fuse by aligning the pin with the leg 78c, being the arming section of groove 78.

The third condition arises as motor burnout commences and gas pressure decreases; spring 50 taking over to move piston 36 back toward the initial position. Each pin 80 now rides in slanting groove 78c causing the shutter to rotate 90 degrees clockwise until squibs 62 are aligned with their respective passageways 74 and 22. Simultaneously, switches 64 become aligned with recesses 76 enabling pin contact 70 to be spring actuated against the shutter, grounding the squib circuit and rendering the fuse ready to fire.

The embodiment of Figs. 1–6 is particularly suitable for short range missiles in which motor burnout could be utilized to finally arm the safety and arming mechanism, and piston groove 78 is configured to accomplish this result. On longer range missiles, it may be desired that arming occur before motor burnout, in which case the piston groove can be designed to effect the rotation of the shutter and arm the mechanism during motor burning, as is illustrated in the embodiment of Fig. 8.

Fig. 7 illustrates a modified lower portion of the safety and arming mechanism to accommodate a hydraulic piston assembly 98. Assembly 98 delays the admission of rocket exhaust gas pressure to operate the mechanism, replacing pad 30 of the embodiment of Figs. 1–6 which provides a similar function. The remaining elements of the modification of Figs. 1–6 are unchanged except as noted below. As shown in Fig. 7 the aft end of outer hollow case 12 is exteriorly threaded at 101 to receive a case extension 100 that houses the assembly, the extension being provided at the other end with a rocket exhaust gas inlet 102 (corresponding to orifice 34) leading to one side of a chamber 104 in which is slidably disposed a free-floating piston 106. A compression coil spring 108 biases the piston against the exhaust gas pressure acting on the other side of the piston. The spring side of the chamber is filled with a low viscosity, high temperature liquid 109, i.e., oil or the like.

Extension 100 is constructed with an intermediate transverse wall 107 having a metering orifice 110 between lower chamber 104 to an upper chamber 112, the latter chamber being open to a longitudinal passageway 111a in plug 111 leading to one side of piston 113. Chamber 104 has a greater volume than chamber 112 for a reason later to be described. Orifice 110 is initially blocked by a rupturable plastic disc 114 cemented or otherwise secured in place for preventing leakage of oil 109 into chamber 112 before rocket firing. Delay time in operation of the safety and arming mechanism can be controlled by varying: the volume of chamber 112, the size of orifice 110, the size and travel of piston 106, the viscosity of oil 109, or the compressibility of spring 108.

Operation of the modification of Fig. 7 is also initiated upon rocket motor firing. Sustained pressure of the rocket exhaust gases admitted through inlet 102 moves piston 106 which compresses spring 108 and oil 109 rupturing disc 114. An initial time delay occurs while the oil is displaced from chamber 104 into chamber 112 through metering orifice 110 until the free volume of chamber 112 and passage 111a are completely filled. Further admission of oil into chamber 112 actuates piston 113 to commence arming of the mechanism.

Arming may be accomplished in the manner previously described in Figs. 1–6, that is, after motor burnout for short range missiles, or during motor burning by means of modified piston 116 shown in Fig. 8. Piston 116, similar to pistons 36 and 113, has a pair of modified grooves 118, configured as a J, which enables the remaining structure of Figs. 1–6 to be armed during motor burning. Groove 118 comprises a substantially straight portion 118a, a coterminous curved portion 118c and an offset portion 118b. Straight portion 118a functions somewhat as a time delay since it prevents rotation of shutter 48 until shutter pins 80 reach the curved portion 118c at which time rotation, and consequent arming, of the mechanism is commenced. When pins 80 reach offset portion 118b, final rotation of shutter 48 is accomplished to arm the mechanism in the manner heretofore described with reference to Figs. 1–6. It is to be noted that the arming achieved by piston 116 occurs while the rocket motor is burning, and offset portion 118b prevents pins 80 from retracing its path and disarming of the mechanism should motor burnout occur before the missile reaches the target.

This invention provides a safety and arming mechanism which renders a guided missile warhead or the like disarmed until both setback, and either rocket motor burning or rocket motor burnout has occurred, thus ensuring that the missile will be sufficiently clear of a launching aircraft to prevent accidental damage. It is to be noted that the device operates without the need of stored energy, and meets the operational requirements of devices relying on stored energy. The mechanism is operated by the presence of rocket motor pressure and relies on a means for limiting the application of the pressure until a predetermined time.

Obviously many modifications and variations of the present invention are possible in the light of the above teachings. It is therefore to be understood that within the scope of the appended claims the invention may be practiced otherwise than as specifically described.

We claim:

1. A gas-operated safety and arming mechanism for a missile employing a rocket motor generating a gas under pressure comprising a case, a movable member having pressure responsive means at one side in said case, said case having an inlet at one end for admitting the gas pressure to said one side of said movable member, means for delaying the application of the gas pressure to the movable member, said case having an outlet at another end, a squib supported in said case, a movable shutter interposed between said outlet and the squib, said shutter having a passage extending therethrough, said shutter being movable from an initial safe position wherein the shutter blocks the outlet to a final armed position wherein said passage connects the squib to the outlet, means for locking said shutter in the safe position, acceleration responsive means for unlocking said shutter, and means interconnecting said movable member and the shutter for moving said shutter whereby said shutter is actuated to an armed position by the movable member upon the admission of a predetermined gas pressure.

2. The mechanism of claim 1 wherein said first named means comprises a filter pad.

3. The mechanism of claim 1 wherein said first named means comprises a fluid operated piston.

4. The mechanism of claim 1 wherein said shutter is a rotatable disc having a bore opening, and said movable member is a piston movable longitudinally the case and through the bore.

5. The mechanism of claim 4 wherein said interconnecting means comprises a groove on the piston and a groove follower mounted on the disc slidably engaging the groove.

6. A gas-operated safety and arming mechanism for a missile employing a rocket motor generating a gas pressure comprising a case, a reciprocable piston mounted in said case, said case having an inlet at one end for admitting the gas pressure to one side of said piston, means for delaying the application of the gas pressure to the piston, spring means opposing the force of said gas pressure and returning the piston toward the initial position when the gas pressure decreases to a predetermined value, said case having an outlet at another end, a squib supported in the case, a rotatable shutter interposed between said outlet and the squib, said shutter having a bore opening through which the piston extends and having a passage extending longitudinally therethrough, said shutter being rotatable about said piston from a safe position wherein said shutter blocks the outlet to an armed position wherein said passage connects the squib to the outlet, detent means for locking said rotatable shutter in a safe position, acceleration responsive means for disengaging said detent means, and interconnecting means between said shutter and said piston for rotating the shutter to an intermediate position of no return when the piston is actuated by gas pressure and for moving said shutter to the armed position when the piston is returned toward the initial position by the spring means.

7. The mechanism of claim 5 wherein a switch is mounted in the shutter and connected in an ignition circuit, said switch being energized by movement of the shutter to the armed position.

8. A gas-operated safety and arming mechanism for a missile employing a rocket motor generating a gas pressure comprising an elongate case, one end of said case having at least one longitudinal outlet, another end of the case having an inlet for admitting the gas pressure, a piston reciprocably mounted in said case, said piston constructed as a sleeve having two oppositely disposed chambers separated by a wall, a plug member mounted within the case at the other end and having an extension slidably mounted within one of said piston chambers, said extension having a longitudinal passage for admitting the gas pressure from said inlet to one side of said piston, a filter pad adjacent said plug member for delaying the admission of gas pressure, a shutter and a manifold each mounted within the case and both having a bore slidably to receive said piston, a compression spring positioned between the manifold and the piston to restrain the latter against said gas pressure, said shutter being longitudinally disposed between said inlet and the manifold and being rotatable about said piston, said shutter having at least one longitudinal passage, at least one squib mounted in said manifold and longitudinally aligned with said outlet, switch means mounted on the manifold and energized by movement of the shutter to an armed position, said shutter being rotatable from a safe position wherein said shutter blocks the outlet to an armed position wherein the passage connects the squib to the outlet, means connecting the manifold and the piston for preventing relative rotation while permitting the piston to reciprocate longitudinally the case, detent means for locking said shutter to the piston in the safe position, acceleration responsive means for disengaging said detent means and releasing the shutter, said piston having at least one groove on the periphery obliquely disposed to a longitudinal axis of the case, a pin mounted on the shutter and engaging said groove whereby longitudinal movement of the piston will effect a corresponding rotation of said shutter to arm said mechanism through said switch.

9. The mechanism of claim 8 wherein said groove is V-shaped and comprises a longitudinal straight portion and an oblique portion connected together by an offset portion whereby said pin rides the straight portion under a predetermined sustained pressure on the piston until the pin engages the offset portion committing the mechanism to arm, and upon motor burnout the pin rides the oblique portion as the piston is being restored to its original position under spring pressure rotating the shutter to the armed position.

References Cited in the file of this patent

UNITED STATES PATENTS

| | | |
|---|---|---|
| 682,728 | Lynch | Sept. 17, 1901 |
| 2,498,025 | Breeze | Feb. 21, 1950 |
| 2,513,185 | Lauritsen | June 27, 1950 |
| 2,595,757 | Brandt | May 6, 1952 |
| 2,704,033 | Koeper | Mar. 15, 1955 |
| 2,730,046 | Bergstrom | Jan. 10, 1956 |
| 2,737,892 | Dalton | Mar. 13, 1956 |